(12) United States Patent  (10) Patent No.: US 7,971,158 B2
Anderson et al.  (45) Date of Patent: Jun. 28, 2011

(54) SPACER FILL STRUCTURE, METHOD AND DESIGN STRUCTURE FOR REDUCING DEVICE VARIATION

(75) Inventors: Brent A. Anderson, Jericho, VT (US); Andres Bryant, Burlington, VT (US); Edward J. Nowak, Essex Junction, VT (US); Jed H. Rankin, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/144,004

(22) Filed: Jun. 23, 2008

(65) Prior Publication Data

US 2009/0319973 A1   Dec. 24, 2009

(51) Int. Cl.
*G06F 17/50* (2006.01)
(52) U.S. Cl. .................. 716/54; 716/124; 430/313
(58) Field of Classification Search .......... 716/54, 716/124; 430/313
See application file for complete search history.

(56) References Cited

U.S. PATENT DOCUMENTS

| | | | |
|---|---|---|---|
| 5,959,311 A | 9/1999 | Shih et al. | |
| 6,436,773 B1 | 8/2002 | Yu | |
| 6,576,487 B1 * | 6/2003 | Wang et al. | 438/17 |
| 6,838,869 B1 | 1/2005 | Rogers et al. | |
| 6,865,727 B2 | 3/2005 | Frerichs et al. | |
| 6,934,928 B2 | 8/2005 | Juengling | |
| 6,995,438 B1 | 2/2006 | Ahmed et al. | |
| 7,071,074 B2 | 7/2006 | Schmidt et al. | |
| 7,174,520 B2 | 2/2007 | White et al. | |
| 7,257,790 B2 * | 8/2007 | Maeda | 716/10 |
| 7,289,933 B2 * | 10/2007 | Luo et al. | 702/167 |
| 2003/0049388 A1 | 3/2003 | Cho et al. | |
| 2004/0239610 A1 | 12/2004 | Ishii | |
| 2005/0052939 A1 | 3/2005 | Osabe et al. | |
| 2005/0076320 A1 * | 4/2005 | Maeda | 716/10 |
| 2005/0233540 A1 | 10/2005 | Yoon et al. | |
| 2007/0118320 A1 * | 5/2007 | Luo et al. | 702/117 |
| 2007/0157139 A1 | 7/2007 | White et al. | |
| 2009/0210834 A1 * | 8/2009 | Chadwick et al. | 716/5 |
| 2009/0278222 A1 * | 11/2009 | Chadwick et al. | 257/499 |
| 2009/0282380 A1 * | 11/2009 | Chadwick et al. | 716/9 |

* cited by examiner

*Primary Examiner* — Naum Levin
(74) *Attorney, Agent, or Firm* — David Cain; Roberts Mlotkowski Safran & Cole, P.C.

(57) ABSTRACT

A design structure is provided for spacer fill structures and, more particularly, spacer fill structures, a method of manufacturing and a design structure for reducing device variation is provided. The structure includes a plurality of dummy fill shapes in different areas of a device which are configured such that gate perimeter to gate area ratio will result in a total perimeter density being uniform across a chip.

15 Claims, 6 Drawing Sheets

SPACER FILL STRUCTURE, METHOD AND DESIGN STRUCTURE FOR REDUCING DEVICE VARIATION

FIELD OF THE INVENTION

The invention relates to a design structure for spacer fill structures and, more particularly, to spacer fill structures, a method of manufacturing and a design structure for reducing device variation.

BACKGROUND

Minimizing device variation continues to grow in importance as a device is scaled from node to node. However, total variation is increasing for many device components as the device is scaled and so finding ways to reduce these affects is critical to delivering product level importance. For example, one element that is introducing additional variation is across chip spacer thickness variation.

More specifically, as silicon technologies offer constantly increasing levels of integration and scaling, integrated circuit designers are continually challenged to increase productivity and produce larger and larger designs with the same or less resources. Smaller circuit elements, sometimes referred to as "macros," each of which include a predetermined structure for a part of an integrated circuit (IC) can be used repetitively for addressing this challenge. For example, the use of repetitive circuit elements eliminates the need for the IC designer to continually re-design sections of the chip, and therefore improves productivity. As a result, design reuse methodology involving the use of IC circuit elements has become an essential part of IC design.

However, the designer that uses IC circuit elements is challenged to provide a product that has predictable functioning for these IC circuit elements. One challenge is matching the electrical behavior of two or more instances of the same circuit element in different locations in an IC design. This is generally at odds with automatically generated dummy shapes, which are placed in the overall design after the layout is complete, and after the designer has performed all circuit analyses.

In particular, if the design system uses automatically placed "dummy fill," or other auto-generated dummy shapes, the dummy fill shapes will be automatically placed around the circuit element. If the circuit element is a sensitive circuit, the designer may wish to insure that every instance of the circuit element function matches as identically as possible to every other instance within the IC. This is at odds with auto-generated dummy shapes, as they are typically located on a consistent grid across an IC design such that different instances of the circuit element may find themselves in substantially different local environments. That is, there is no guarantee that different instances of the same circuit element will see the same local environment, e.g., dummy fill and hole shapes, when placed within the IC design.

Any resulting mismatch in electrical parameters (e.g., resistance, capacitance, etc.) is unknown to the designer, and acts to degrade the function of the precision circuits in question. More specifically, even though the transistors may be designed the same, the resultant device is a non-uniform design due to the placement and shape of the dummy fill shapes. That is, the shape and density of the transistors (gates) of the device will affect the area in which dummy fill shapes can be placed on the chip which, in turn, will affect the characteristics of the transistor.

As an example, the density of the device will affect the shape and number of the dummy fill shapes, i.e., the more transistors the less space for dummy fill spacers. And, due to such variations, the transistor performance and characteristics will be affected which results in a tradeoff between speed and power consumption. For example, non-uniformity in design results in transistors of faster and slower speeds, as well as transistors that consume more and less power. Taking this as a starting point, the device will be limited, e.g., only as fast, by the slowest of the transistors. Likewise, the device will consume more power.

In order to address this issue, many designers attempt to inhibit the automatic generation of dummy shapes in the vicinity of sensitive circuits, and place all required dummy shapes by hand. This approach, however, is more difficult for the designer, and is generally detrimental to the overall manufacturability and process window. Accordingly, there exists a need in the art to overcome the deficiencies and limitations described hereinabove.

SUMMARY

In a first aspect of the invention, a structure comprises a plurality of dummy fill shapes in different areas of a device which are configured such that gate perimeter to gate area ratio will result in a total perimeter density being uniform across a chip.

In embodiments, the dummy fill shapes are gate structures in inactive areas of the device. The dummy fill shapes have different shapes in a same area or the different areas of the device. Example shapes include an E shape, a C shape, a concentric pattern, parallel and perpendicular gate portions, and parallel gates. The different shapes include spacer material about a perimeter portion of the different shapes. A ratio of the area of the spacer material to gate area is different about the different shapes. The spacer material is formed over at least a portion of an inactive region of the device. The inactive gates and spacer material form the dummy fill shapes and may be perpendicular to an inactive portion of the substrate, overlap with the substrate, extend past the substrate or be completely within the substrate forming the inactive region of the device.

In another aspect of the invention, a method comprises generating dummy fill shapes of different shapes such that a sum of the dummy fill shapes gate perimeter and active gates gate perimeter in each localized area is substantially uniform such that the gate perimeter density and gate area density being uniform across a chip.

In another aspect of the invention, a dummy fill shape generator comprises a module configured to adjust or modify different dummy fill shapes throughout a device until there is substantial uniform perimeter area density throughout each of different areas of the device.

In yet another aspect of the invention, a design structure is embodied in a machine readable medium for designing, manufacturing, or testing an integrated circuit. The design structure comprises a plurality of dummy fill shapes in different areas of a device which are configured such that gate perimeter to gate area ratio will result in a total perimeter density being uniform across a chip.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1A:
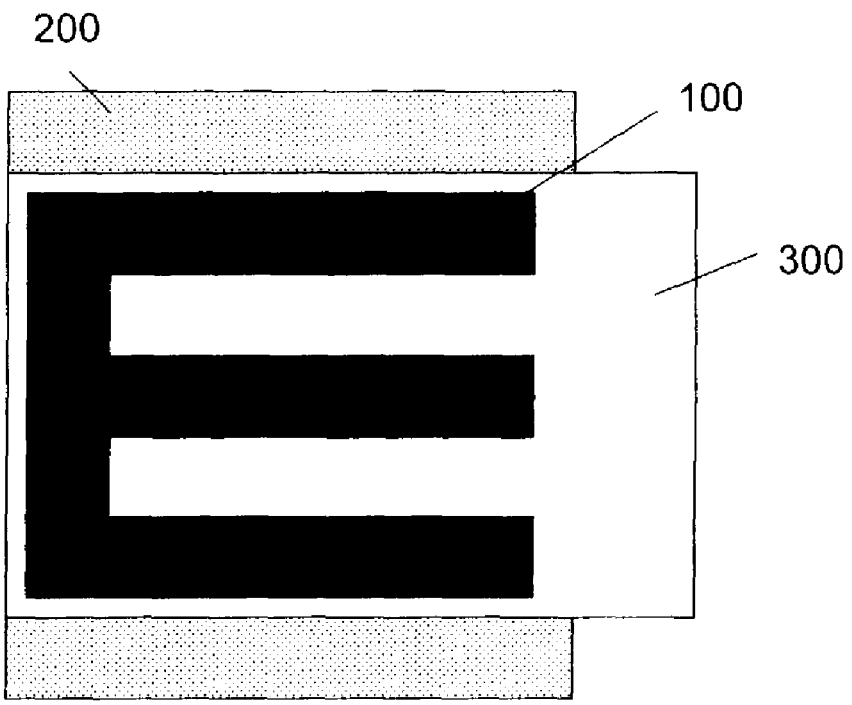
FIGS. 1a-1e show illustrative examples of dummy fill structures for uniform perimeter area density in accordance with the present invention.

The invention relates to a design structure for spacer fill structures and, more particularly, to spacer fill structures, a method of manufacturing and a design structure for reducing device variation. More specifically, the present invention provides a method and design structure to control gate perimeter density such that it is uniform across the chip so that spacers form uniform thickness. In embodiments, the gate perimeter includes active and dummy gates. Advantageously, this results in improved uniformity of the spacer thickness and hence improved device performance. As such, the resultant device of the present invention will optimally perform at design speeds and power consumption.

In implementation, by adjusting the shape of the dummy gate structure it is possible to change the gate perimeter to gate area ratio. This allows modification of the gate perimeter density in localized areas without modifying the gate area density (which is critical for lithography patterning, etch, and anneals). Thus, it is contemplated by the invention to control the total gate perimeter density (active and dummy) so that the total perimeter density is uniform across the chip.

FIGS. 1a-1e show illustrative examples of dummy fill structures for uniform perimeter area density in accordance with the present invention. It should be recognized that FIGS. 1a-1e are not to scale and that in implementing the present invention the gate perimeter and gate area are modified such that the gate perimeter and gate area can be made uniform. As seen in these representative illustrations, by adjusting the shape of the dummy gate structure it is possible to change the gate perimeter to gate area ratio thereby allowing modification of the gate perimeter density in localized areas without modifying the gate area density. Those of skill in the art will realize that the embodiments will result in spacers forming uniform thickness. Also, those of skill in the art will recognize that the dummy fill structures of FIGS. 1a-1e are merely illustrative examples of the different shapes that are contemplated by the invention. As such, the present invention contemplates many different fill structure shapes including, in embodiments, a combination of standard fill shapes with non-standard fill shapes. The shapes shown in FIGS. 1a-1e should thus not be considered limiting features of the present invention.

More specifically, FIGS. 1a-1e show dummy gates 100 of different shapes formed in an inactive area 200 of the device. The dummy gates 100 may be manufactured using conventional lithographic and etching processes, and may comprise, for example, polysilicon. The inactive area 200 may be, for example, a silicon substrate. FIGS. 1a-1e also show spacer material 300 formed about the perimeter of each of the different dummy gates 100. The spacer material 300 may be, for example, a thermal oxide, nitride or a combination of oxide and nitride, all well known to those of skill in the art. The spacer material 300 may be deposited and formed using conventional deposition and etching processes, which do not need further explanation herein. As should be recognized, the dummy gates and respective spacer material form the dummy fill structures.

In implementing the present invention, it is possible to control the spacer density (area of the spacers) about the dummy gates 100 by providing different shapes of the dummy gates 100. This, in turn, allows the designer to control gate perimeter density to be uniform across the chip so that spacers form of uniform thickness. The gate perimeter includes active and dummy gates. In implementation, by adjusting the shape of the dummy gate structure it is possible to change the gate perimeter to gate area ratio. This allows modification of the gate perimeter density in localized areas without modifying the gate area density (which is critical for lithography patterning, etch, and anneals). Thus, as a result of modifying the ratio of gate area to gate perimeter for area uniformity across the device, it is possible to ensure uniformity of processing across the device. This uniformity of processing, e.g., thermal annealing and etching process across the entire device, will ensure that the device will run at design speeds and power consumption. That is, the present invention will reduce processing variations resulting in more or less leaky and/or non-leaky gates and hence consistent Vt across the various transistors.

Figure 1B:
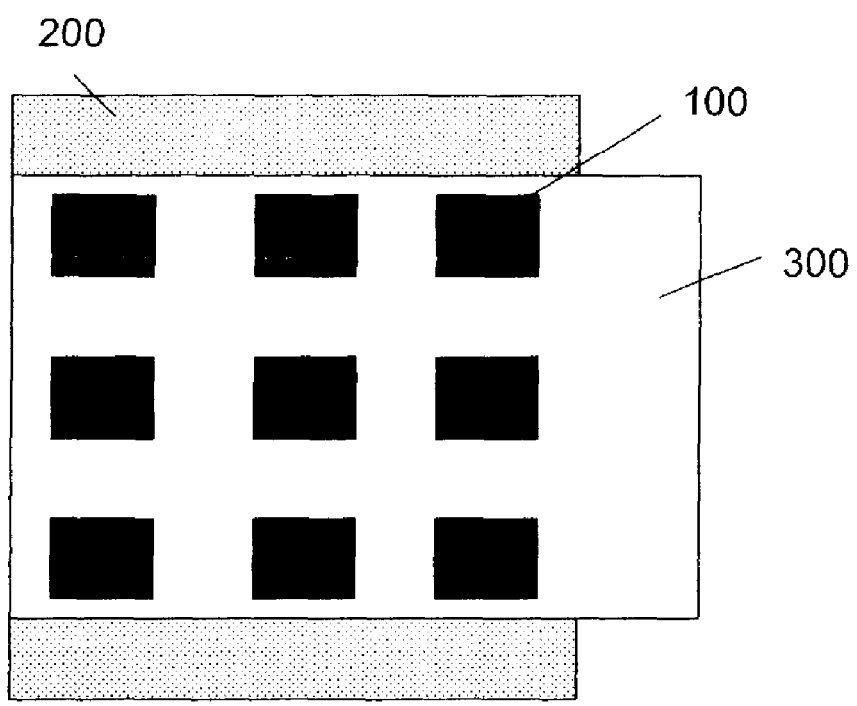
Figure 1C:
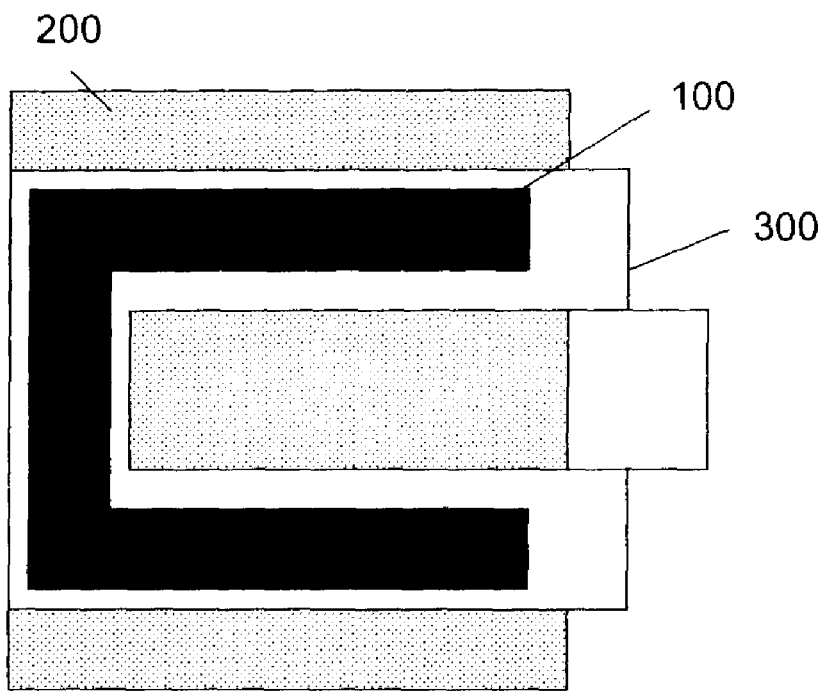
Figure 1D:
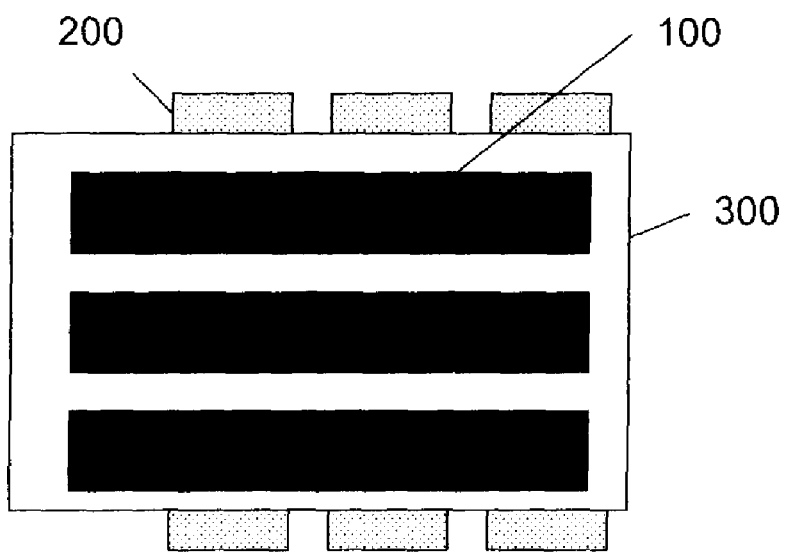
Figure 1E:
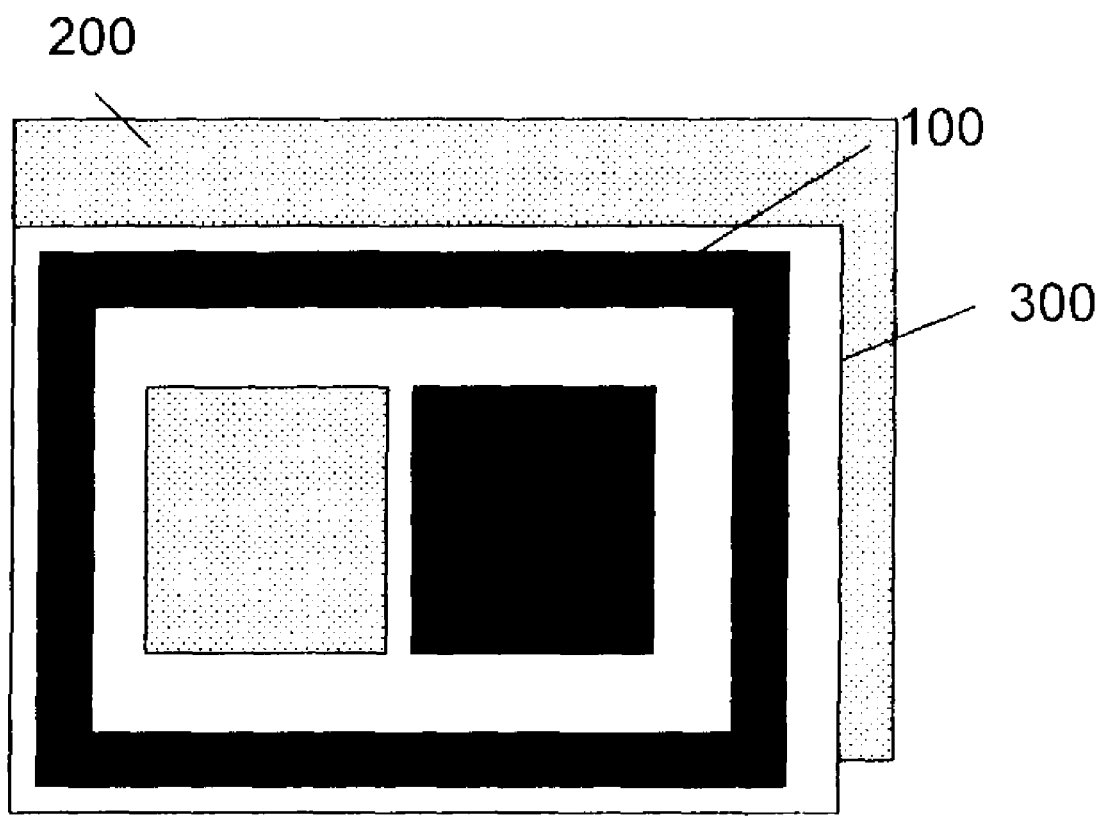

FIG. 1a shows a dummy gate 100 in the shape of an "E", which includes parallel and perpendicular portions. In this embodiment, the dummy gates 100 and spacer material 300 extend beyond the inactive portion of the substrate 200. FIG. 1b shows a plurality of dummy gates 100 in a grid pattern. More specifically, FIG. 1b shows nine distinct dummy gates 100, each having perimeter areas filled with spacer material 300. In this embodiment, some of the dummy gates 100 and spacer material 300 extend beyond the inactive portion of the substrate 200. FIG. 1c shows a dummy gate 100 in the shape of a "C". In this embodiment, the portions of the legs of the C shape dummy gate 100 and spacer material 300 extend beyond the inactive portion of the substrate 200. FIG. 1d shows three parallel dummy gates 100. In this and other embodiments, the gates and spacer material forming the dummy fill shapes can be perpendicular to a substrate forming the inactive region of the device. FIG. 1e shows dummy gates 100 in a substantially concentric pattern, with a large area for spacer material 200 in a middle of the structure.

As discussed above, other shapes are also contemplated by the present invention in order to change the gate perimeter to gate area ratio. Also, as seen from these figures, as it is possible to control gate perimeter density to be uniform across the chip, the spacers will form of uniform thickness. This will ensure that the thickness of the spacer material on active transistors will be more uniform across the device, as different patterns can be used in different areas. Also, as seen in these figures and contemplated by the invention, the gates and spacer material forming the dummy fill shapes can be perpendicular to the substrate, overlap with the substrate, extend past the substrate and be completely within the substrate forming the inactive region of the device.

Thus, as a result of the different shapes with different perimeters, it is possible to control the spacer thickness about the active gates. The uniformity of the spacer material thickness 300 will result in more improved device performance since the implant location will be more uniform between devices. In this way, the transistors and hence the device is more uniform or consistent in speed and power consumption.

Environment and System Overview

Figure 2:
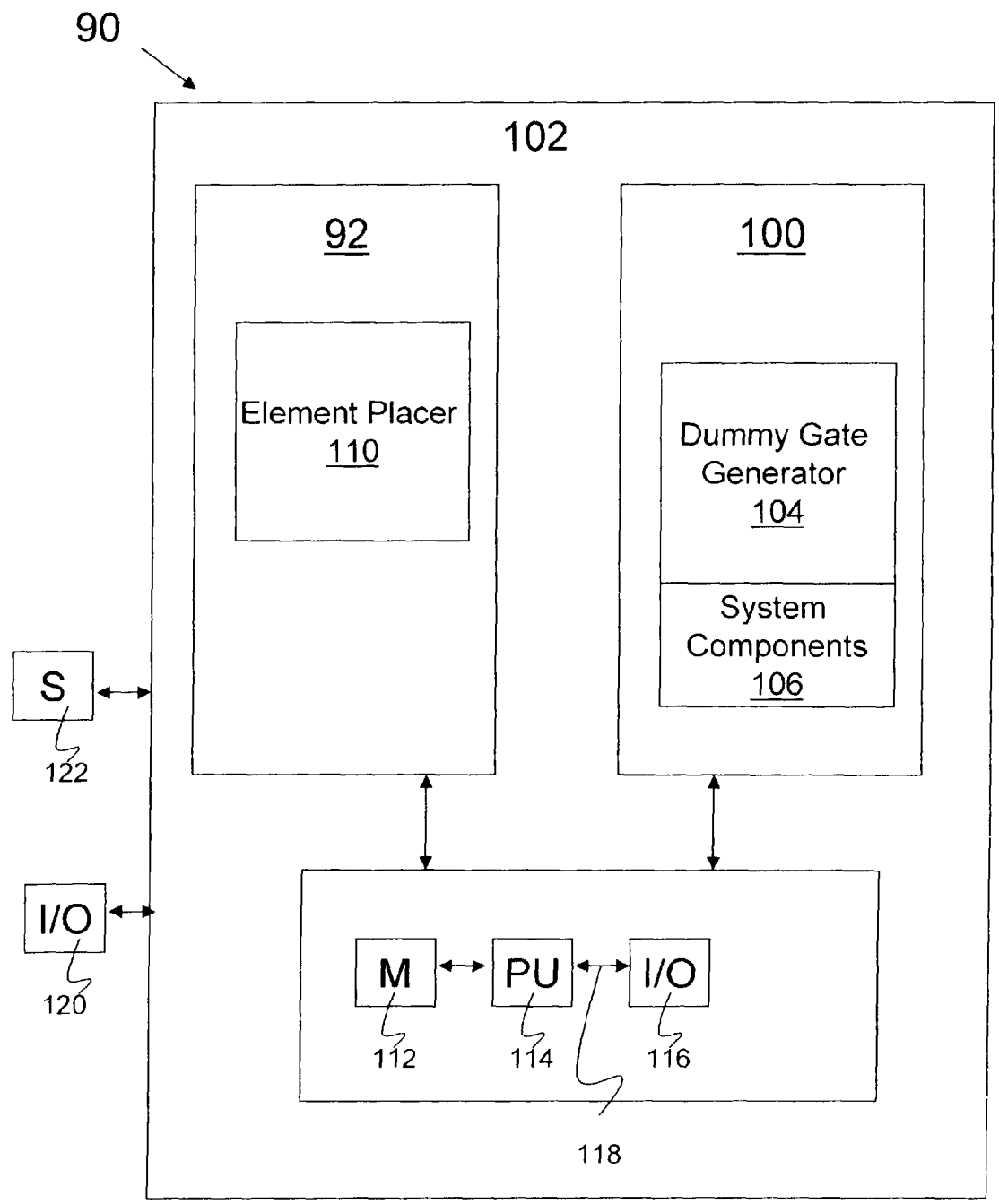
FIG. 2 is a block diagram of a design environment in accordance with the invention.

FIG. 2 is a block diagram of a design environment 90 in accordance with the invention. The design environment 90 includes a customer design system 92 on which a designer designs an integrated circuit (IC), and a fabrication design system 100 that receives the design, modifies the design and generates the IC. Typically, a customer of the fabrication design system 100 designs an integrated circuit on the customer design system 92 and provides data for fabrication by system 100. It should be recognized, however, that this environment is illustrative only, and that the invention may be employed in other environments.

For purposes of brevity, the structure of fabrication design system 100 only will be described; although the customer design system 92 may include similar structures. The system 100 is shown implemented on computer 102 as computer program code. To this extent, the computer 102 is shown including a memory 112, a processing unit (PU) 114, an input/output (I/O) interface 116, and a bus 118. Further, the computer 102 is shown in communication with an external I/O device/resource 120 and a storage system 122. The bus 118 provides a communication link between each of the components in the computer 102, the I/O device 120 and the storage system 122. The I/O device 120 can comprise any device that enables a user to interact with computer 102 (e.g., keyboard, pointing device, display, etc.).

In general, the processor 114 executes computer program code, such as system 100, that is stored in memory 112 and/or storage system 122. While executing the computer program code, the processor 114 can read and/or write data to/from memory 112, storage system 122, and/or I/O device 120.

Alternatively, a user can interact with another computing device (not shown) in communication with the computer 102. In this case, the I/O device 116 can comprise any device that enables the computer 102 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer 102) may utilize conventional network connectivity, such as Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

The memory 112 and/or storage system 122 may reside at one or more physical locations. The memory 112 and/or storage system 122 can comprise any combination of various types of computer-readable media and/or transmission media including magnetic media, optical media, random access memory (RAM), read only memory (ROM), a data object, etc. Further, it is understood that one or more additional components (e.g., system software, math co-processor, etc. can be included in the computer 102. To this extent, the computer 102 can comprise any type of computing device such as a network server, a desktop computer, a laptop, a handheld device, etc.

The fabrication design system 100 includes a dummy shape generator 104 and other system components 106. The dummy fill shape pattern is automatically generated between circuit elements by the dummy shape generator 104 in accordance with the invention. For example, depending on the density and size of the circuit elements, e.g., active devices, the dummy shape generator 104 will select different dummy fill shapes throughout the device to ensure uniform gate perimeter density throughout the device. This will, in turn, result in more uniform fabrication processes, which will eliminate processing variations that may affect overall device performance. The customer design system 92 may include a circuit (ckt.) element placer 110. A user can place circuit elements throughout a design using circuit element placer 110 of customer design system 92.

Method

Figure 3:
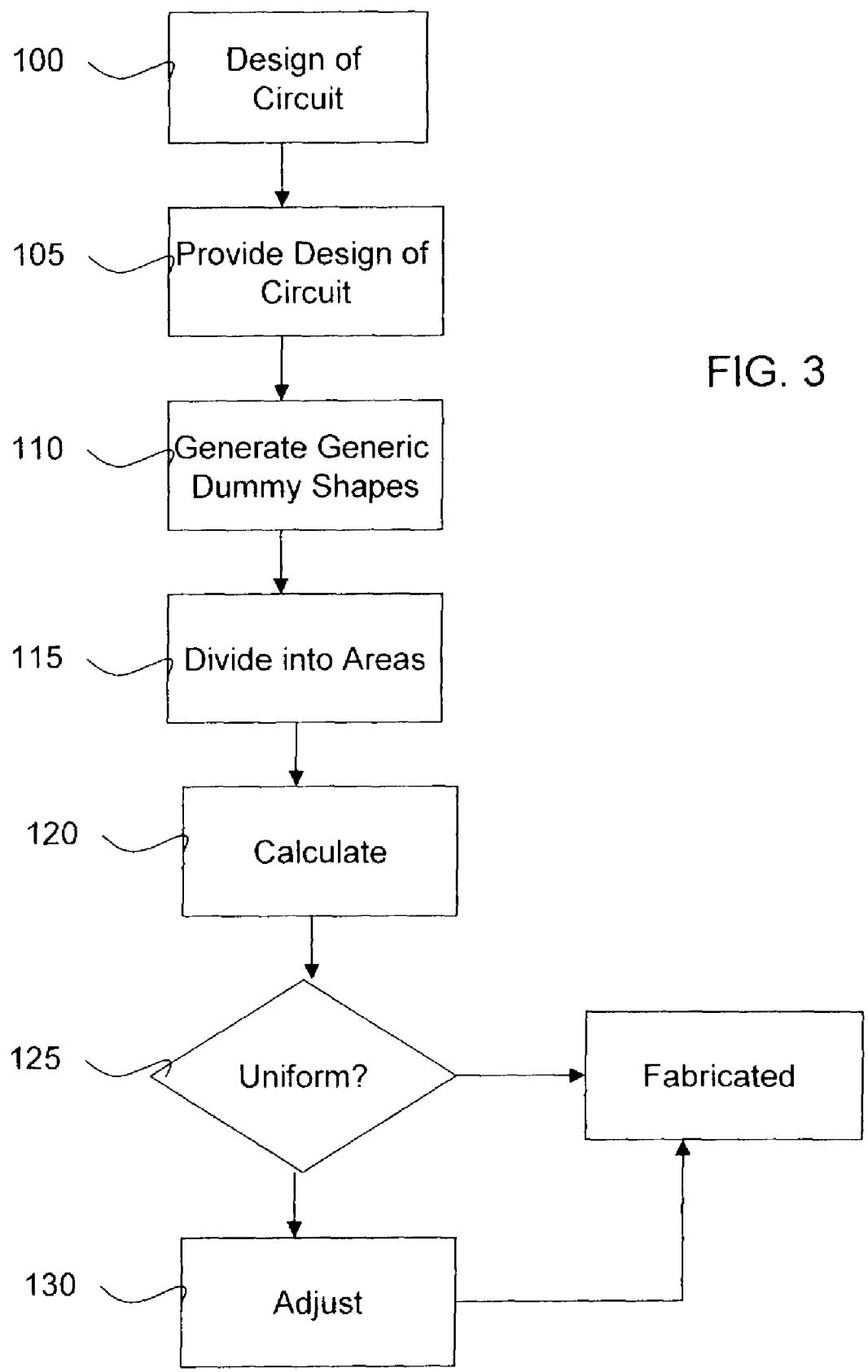
FIG. 3 shows a flow diagram implementing process steps in accordance with the invention.

FIG. 3 is a flow diagram implementing steps of the invention implemented in the environment of FIG. 2. The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, the invention provides a method that performs the steps of the invention on a subscription, and/or fee basis. That is, a service provider, such as a design house, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement and/or the service provider can receive payment from the sale of advertising content to one or more third parties.

Referring to FIG. 3, at step 100, a design of circuit elements is provided using, for example, the circuit element placer of the customer design system. At step 105, the design is provided to the fabrication design system. At optional step 110, the dummy shape generator generates generic dummy fill shapes in empty spaces of the chip. In embodiments, the dummy shape generator may divide the chip into areas by, for example, functionality of the circuit elements, real estate of the chip or any number of other methodologies, at step 115. At step 120, the dummy shape generator calculates the entire gate perimeter for each area (e.g., a sum of all gate perimeters in the area), which may include the dummy fill shapes (inactive devices) and active devices.

At step 125, the dummy shape generator determines if the gate perimeter to gate area ratio will result in a total perimeter density being uniform across the chip. If so, the IC device can be fabricated. If not, at step 130, the dummy shape generator will adjust the dummy fill shapes to ensure that all gate perimeter to gate area ratio will result in a total perimeter density being uniform across the chip. Once this is determined, the IC device can be fabricated.

The processes above may be iterative until a uniform density is calculated. Also, it should be recognized that step 110 may be eliminated such that the dummy shape generator will calculate the dummy fill shapes and the area of the spacer material around the dummy fill shapes based on the design of the active circuit elements.

Design Structure

Figure 4:
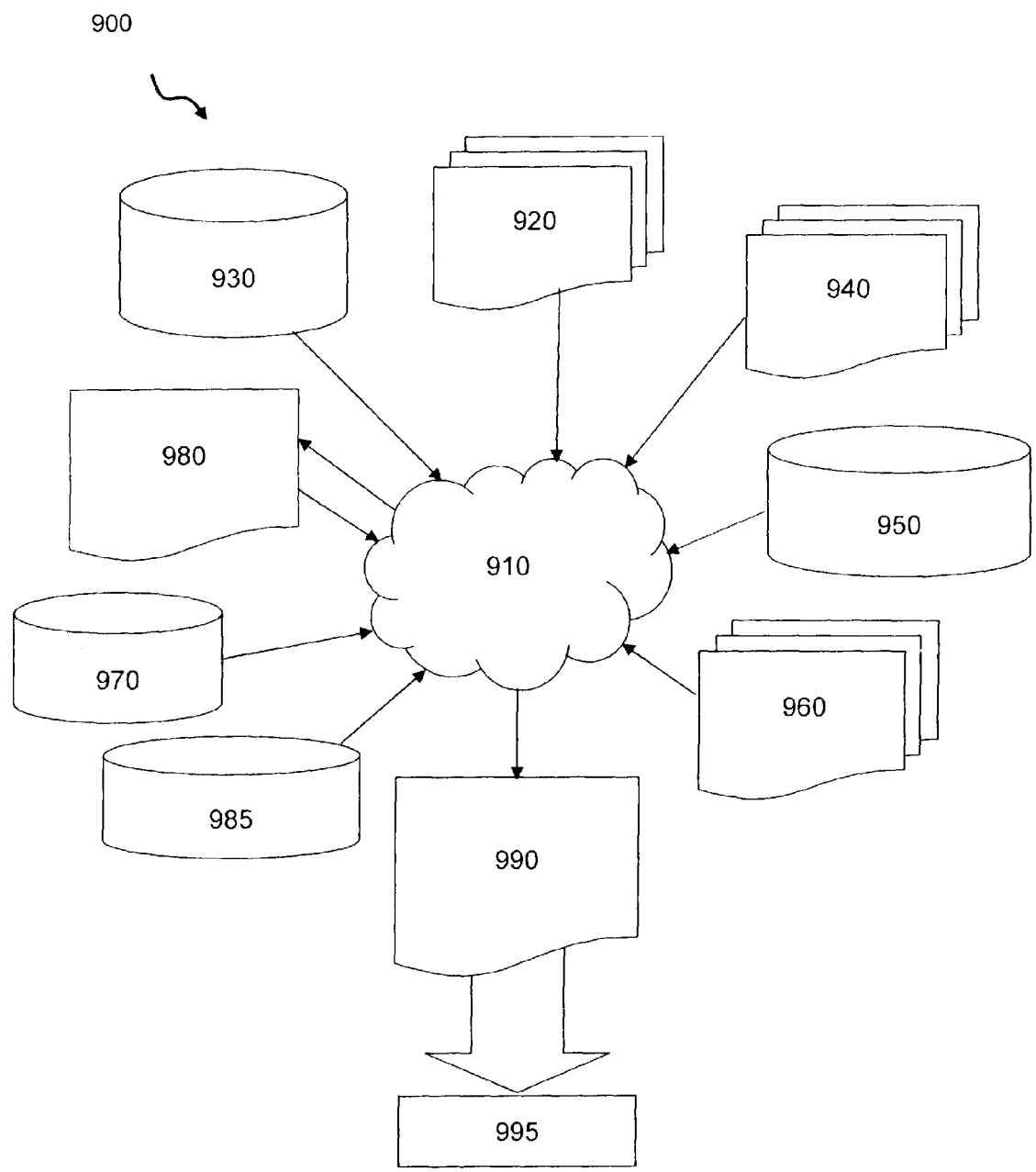
FIG. 4 is a flow diagram of a design process used in semiconductor design, manufacture, and/or test.

FIG. 4 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc. Design structure 920 is preferably an input to a design process 910 and may come from an IP provider, a core developer, or other design company or may be generated by the operator of the design flow, or from other sources. Design structure 920 comprises an embodiment of the invention as shown in FIGS. 1a-1e in the form of schematics or HDL, a hardware-description language (e.g., Verilog, VHDL, C, etc.). Design structure 920 may be contained on one or more machine-readable media. For example, design structure 920 may be a text file or a graphical representation of an embodiment of the invention as shown in FIGS. 1a-1e. Design process 910 preferably synthesizes (or translates) embodiments of the invention as shown in FIGS. 1a-1e into a netlist 980, where netlist 980 is, for example, a list of wires, transistors, logic gates, control circuits, I/O, models, etc. that describes the connections to other elements and circuits in an integrated circuit design and recorded on at least one of machine readable media. For example, the medium may be a CD, a compact flash, other flash memory, a packet of data to be sent via the Internet, or other networking suitable means. The synthesis may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIGS. 1a-1e, along with any additional integrated circuit design or data (if applicable), into a second design structure 990. Design structure 990 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce embodiments of the invention as shown in FIGS. 1a-1e. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. If the invention is a semiconductor chip: The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those of skill in the art will recognize that the invention can be practiced with modifications and in the spirit and scope of the appended claims.

What is claimed is:

1. A method, using a computing device, comprising generating dummy fill shapes of different shapes such that a sum of gate perimeters of the dummy fill shapes and active gates in each localized area is substantially uniform such that result is total gate perimeter density being uniform across a chip.

2. The method of claim 1, further comprising determining a circuit design of active transistors prior to the generating the dummy fill shapes within the plurality of predetermined areas.

3. The method of claim 1, wherein the plurality of predetermined areas are divided by at least one of functionality of circuit elements and real estate of the chip.

4. The method of claim 1, further comprising calculating a sum of gate perimeters for a plurality of dummy gates in each predetermined area in the chip.

5. The method of claim 4, wherein the sum is provided for at least the dummy fill shapes.

6. The method of claim 5, wherein the dummy fill shapes includes spacer material about a perimeter thereof.

7. The method of claim 6, further comprising adjusting the gate perimeters to gate area ratio for dummy fill shapes such that each predetermined area has a uniform total gate perimeter density and gate perimeter area throughout the chip.

8. The method of claim 4, wherein the calculating determines when a combined gate perimeter area density for combined dummy fill shapes for each of the predetermined areas is uniform.

9. The method of claim 8, wherein the steps are iterative.

10. The method of claim 1, further comprising generating generic dummy fill shapes and adjusting a gate perimeter to gate area of the generic dummy fill shapes until predetermined areas has a uniform total gate perimeter density in each of the predetermined areas.

11. The method of claim 1, wherein the generating the dummy fill shapes of different shapes includes generating the dummy fill shapes such that the different shapes include different gate perimeter to gate area ratios.

12. The method of claim 11, wherein the dummy fill shapes includes spacer material about a perimeter thereof and an area of the spacer material is different about the different shapes.

13. The method of claim 12, further comprising adjusting the gate perimeters to the gate area ratios for the dummy fill shapes such that the total gate perimeter density and gate perimeter area are uniform throughout the chip.

14. A method comprising:
using a computing device for:
generating dummy fill shapes of different shapes such that a sum of gate perimeters of the dummy fill shapes and active gates in each localized area is substantially uniform such that result is total gate perimeter density being uniform across a chip;
calculating a sum of gate perimeters for a plurality of dummy gates in each predetermined area in the chip; and
adjusting the gate perimeters to gate area ratio for dummy fill shapes such that each predetermined area has a uniform total gate perimeter density and gate perimeter area throughout the chip,
wherein the sum is provided for at least the dummy fill shapes; and
the dummy fill shapes includes spacer material about a perimeter thereof.

15. A method comprising:
using a computing device for:
generating dummy fill shapes of different shapes such that a sum of gate perimeters of the dummy fill shapes and active gates in each localized area is substantially uniform such that result is total gate perimeter density being uniform across a chip; and
adjusting the gate perimeters to gate area ratio for dummy fill shapes such that each predetermined area has a uniform total gate perimeter density and gate perimeter area throughout the chip.

* * * * *